United States Patent [19]
Pitkänen et al.

[11] Patent Number: 5,590,688
[45] Date of Patent: Jan. 7, 1997

[54] DEVICE PROVIDED WITH A GAS FLOW CHANNEL TO REDUCE NOISE CAUSED BY THROTTLING A GAS FLOW

[75] Inventors: Harri Pitkänen, Espoo; Markku Simula, Vantaa, both of Finland

[73] Assignee: Neles-Jamesbury Oy, Helsinki, Finland

[21] Appl. No.: 401,096

[22] Filed: Mar. 8, 1995

[30] Foreign Application Priority Data

Mar. 9, 1994 [FI] Finland ................................ 941116

[51] Int. Cl.⁶ ........................................................ F15D 1/02
[52] U.S. Cl. .................................................. 138/39; 138/44
[58] Field of Search .................................. 138/39, 44, 40; 181/224, 229, 249, 232, 267, 270, 281; 244/1 N

[56] References Cited

U.S. PATENT DOCUMENTS

| | | | |
|---|---|---|---|
| 1,611,475 | 12/1926 | Maxim | 181/249 |
| 2,456,626 | 12/1948 | Dahnke | 138/44 |
| 2,790,463 | 4/1957 | Delano et al. | 138/44 |
| 2,914,915 | 12/1959 | Sziklas et al. | 138/44 |
| 3,124,153 | 3/1964 | Lovelace | 138/39 |
| 3,566,922 | 3/1971 | Legg nee Jouve et al. | 138/39 |
| 4,007,908 | 2/1977 | Smagghe et al. | 138/44 |
| 4,494,625 | 1/1985 | Mathes | 181/281 |
| 4,592,390 | 6/1986 | Boyd | 138/44 |
| 4,735,224 | 4/1988 | Pluvoise | 138/44 |
| 4,861,165 | 8/1989 | Fredriksson et al. | 138/44 |
| 4,964,733 | 10/1990 | Fredriksson et al. | 138/44 |
| 5,174,113 | 12/1992 | Deville | 138/44 |
| 5,183,974 | 2/1993 | Wilhelm et al. | 181/249 |

FOREIGN PATENT DOCUMENTS

| | | |
|---|---|---|
| 0000187 | 1/1979 | European Pat. Off. . |
| 2262956 | 7/1974 | Germany . |

*Primary Examiner*—David Scherbel
*Assistant Examiner*—James F. Hook

[57] ABSTRACT

A method and a device for reducing the noise caused by throttling a gas flow in a flow channel (1), where after the throttling part (2) there is a wider part (3). The wider part (3) following the throttling part (2) of the flow channel (1) has at least one deviation of the cross-section (D) formed by a wall protrusion (5) in a short part (1) of the channel. The cross-section of the channel wall protrusion (5) taken length-wise of the channel tapers towards the central part of the channel. In a trans- or supersonic flow the protrusion causes a straight shock wave, a so-called Mach disk, in the flow, and this disk is made to occur and to remain within a wide pressure drop ratio range.

13 Claims, 3 Drawing Sheets

DEVICE PROVIDED WITH A GAS FLOW CHANNEL TO REDUCE NOISE CAUSED BY THROTTLING A GAS FLOW

FIELD OF THE INVENTION

This invention relates to a method for reducing the noise caused by throttling a gas flow in a flow channel, where after the throttling part there is a wider part, the wider part following the throttling part of the flow channel having at least one deviation of the cross-section formed by a wall protrusion in a short part of the channel. The invention also relates to a device having a gas flow channel, which has a throttling part followed by a wider part, the wider part after the throttling part having at a point, which is closer to the entrance end than to the exit end of the wider part, a deviation of the cross-section formed by a wall protrusion in a short part of the channel. The invention is suitable for use e.g. in control valves and in noise reduction on the exit side of other valves, too, and it may also be used in many other applications, for example, in air-blast guns used for cleaning.

BACKGROUND OF THE INVENTION

Flow throttling means reducing of a pressure either by a varying or a constant area throttling device, e.g. by a control valve or an orifice plate. When a gas flow is being throttled, part of the energy of the flow is converted into noise. The noise caused by flow throttling is dependent mainly on two factors, one of which is the flow velocity and the other is the pressure drop ratio across the throttling device. Pressure drop ratio here means the differential pressure divided by the inlet pressure, dp/p1, which is within the range 0 ... 1, with the pressure decreasing in the flow direction.

The pressure drop ratio across the throttling device is dependent on the throttling area and on the flow velocity. With low pressure drop ratio values the flow is subsonic at the throttling point. Subsonic flow means that the flow velocity at the throttling is below sonic velocity. At the throttling point the flow velocity is increased due to changes in the flow cross-sectional area and gas density. In a subsonic flow the flow turbulence is the main source of noise. With high pressure drop ratios the flow is trans- or supersonic, which means that the flow velocity is close to the sonic speed or exceeds it. Shock waves forming in the flow, their vibration and interactions with the flow turbulence are then the main source of noise.

A shock wave is a very thin, almost discontinuous zone forming in a compressing gas flow and over which the gas density, pressure and flow velocity are changing significantly over a very short distance. In general terms, the noise caused by a trans- or supersonic flow is a much more serious problem than the noise caused by a subsonic flow. In other words, high pressure drop ratios across the throttling cause significantly more noise than low pressure drop ratios do.

Means of reducing the noise caused by gas throttling are either by reducing or suppressing the already existing noise or by preventing the generation of excessive noise levels. Existing noise can be reduced, for example, by insulation. The generation of high noise levels can be prevented by dividing the flow into many small jets, for example U.S. Pat. No. 4,108,210 (Luthe et al). The throttling can be divided into several steps, for example U.S. Pat. No. 4,921,014 (Tartaglia et al) or by designing the throttling geometry itself to be favourable in terms of noise, for example U.S. Pat. No. 4,149,563 (Seger). Dividing the flow into several small jets changes the frequency division of the noise and reduces the noise level sensed by the human ear. By dividing the throttling into several steps the pressure drop ratio existing across an individual step can be reduced and in this way the total noise level can be reduced. The degree of turbulence and the generation of shock waves can both be influenced by the throttling geometry.

It is a known fact that very good noise reduction values are achieved with a stepped and a so-called Laval nozzle hole geometry (Nakano, Tajima, Kumaido: A Study of Improvement of Noise Suppression in a Low-Noise Valve of the Multi-hole Type, 2nd report, Nippon Kikai Gakkai Robunshu, B Hen/Transactions of the Japan Society of Mechanical Engineers, Part B, Vol. 55, No. 520; Seiner: Acoustic Near-Field Properties Associated with Broadband Shock Noise, AIAA Journal, Vol. 22, No. 9; Tam: On Broadband Shock Associated Noise of Supersonic Jets, Recent Advances in Aeroacoustics, Proceedings of an International Symposium, Springer Verlag, NY. 1986).

A stepped nozzle means a nozzle where the point of connection between the throttling part and the following expanded part is formed by a plane which is perpendicular to the flow direction or by a relatively short expanding cone. A Laval nozzle is one where the initial channel area is first reduced and tapering and then again increases and becomes conical or curved, finally discharging into a wide space. The major problem in noise reduction with a Laval nozzle is that good reduction capability is obtained only within a very narrow pressure drop ratio range. In practice, this may mean an increase of up to 20 dB in the noise level, with only a small change in the noise ratio. Such a change can mean that the pain threshold is exceeded. However, in control valves, for example, the pressure drop ratio may vary even over a wide range depending on the opening position of the control means and on the process to be controlled.

SUMMARY OF THE INVENTION

The object of this invention is to obtain noise reduction that works even within a wider pressure drop ratio range. It is possible to widen the narrow effective pressure drop ratio range through geometrical changes when the reasons for the occurrence of a "noise dip" are known. The literature says that noise reduction in a stepped nozzle is related to the occurrence of a shock wave called a Mach disk in the flow. A Mach disk is a straight shock wave formed between two oblique shock waves. A straight shock wave here means a wave which is perpendicular to the direction of flow whereas an oblique shock wave means one forming an oblique angle with the direction of flow.

Generally speaking, the excellent reduction properties of a step hole and a Laval nozzle are associated with a state of stable shock waves, whereby as little vibration of shock waves as possible will occur in the flow. The silence of a step hole can be explained by the formation of a strong straight shock wave or a Mach disk, because the shock wave pattern will then be suppressed more quickly than in a situation where the shock waves are oblique. The noise caused by shock waves will be the lower the fewer of these waves occur in the flow.

The method of the invention is characterized in that the cross-section of the channel wall protrusion taken lengthwise of the channel tapers towards the central part of the channel so that in a trans- or supersonic flow the protrusion causes a straight shock wave, a so-called Mach disk, in the flow, and this disk is made to occur and to remain within a wide pressure drop ratio range. The device according to the invention is characterized in that the cross-section of the channel wall protrusion taken lengthwise of the channel tapers towards the central part of the channel so that in a trans- or supersonic flow the protrusion causes a straight shock wave, a so-called Mach disk, in the flow.

When a good universal noise reducer is desired, the noise reduction must be achieved within a wide pressure drop ratio range. In the method according to the invention the geometry of a stepped hole is designed in such a way that a disturbance is obtained in the flow to generate a Mach disk in a transor supersonic flow at lower pressure drop ratios and correspondingly to retain it even at higher pressure drop ratios. This phenomenon is achieved by changing the geometry of a stepped hole, for example, so that a notch, a protrusion or a step is made inside the stepped nozzle.

The structure according to the invention causes the resulting Mach disk to remain when the pressure drop ratio becomes higher. When a Mach disk occurs, the noise of the flow is reduced. If there is no deviation in the cross-section after the throttling point, then a Mach disk will occur only within a narrow pressure drop ratio range. The reduction is lost outside the said pressure drop ratio range. By means of the deviation in the cross-section a Mach disk can be made to occur at a desired point in the expanding part.

BRIEF DESCRIPTION OF THE DRAWINGS

The invention and its details are described more closely in the following, referring to the enclosed drawings in which.

DETAILED DESCRIPTION OF THE INVENTION

Figure 1:
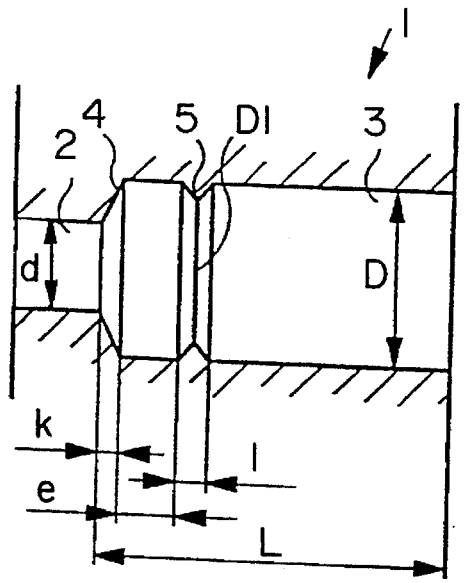
FIGS. 1–3 show lengthwise sections of different applications of flow channels according to the invention.

The flow direction in the drawings is from left to right in the flow channel. In the entrance end of channel 1 there is a throttling part 2 with a diameter d and followed by an expanded part 3 with a greater diameter D. The length of the connection area 4 between the throttling part and the expanding part is k. In the entrance end of the expanding part there is a deviation in the cross-section to generate a Mach disk in the channel. The length of the deviation is l and the total length of the expanding part and the deviation is L.

In the application of FIG. 1 the deviation is formed by an annular protrusion 5 in the channel wall at which the channel cross-section is smaller and the channel diameter is D1. The cross-sectional shape of the protrusion is a triangle with its point towards the central part of the channel. The deviation is at a short distance e from the entrance end of the wider part.

Figure 2:
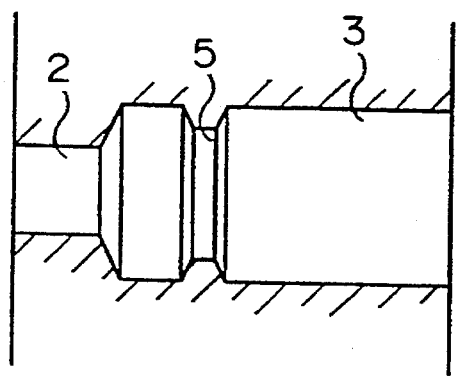
Figure 3:
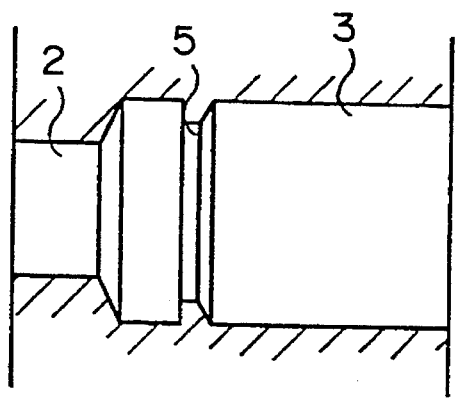

FIGS. 2 and 3 show protrusions 5 which are chamfered in different ways.

Figure 4:
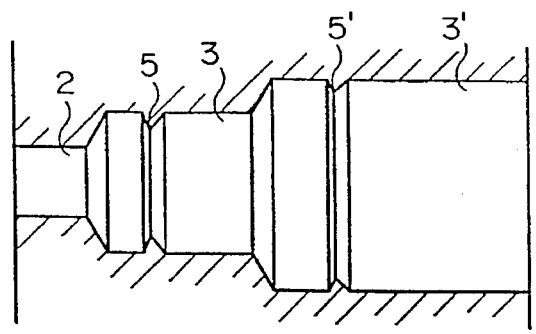
FIG. 4 is a lengthwise section of an application having two channel expansions one after the other in a series.

FIG. 4 shows an application where the first wider part 3 is followed by a second wider part 3' and which also has a protrusion 5' generating a Mach disk.

Figure 5:
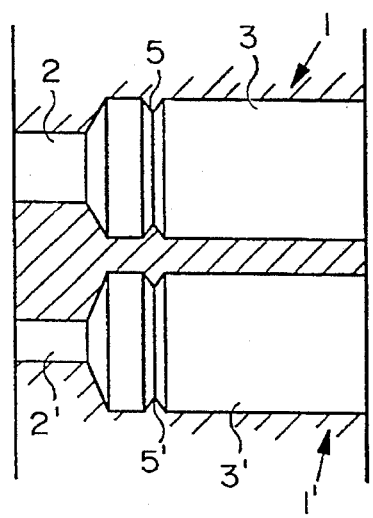
FIG. 5 is a lengthwise section of an application having two holes in parallel with different surface area ratios.

The application shown in FIG. 5 has two channels 1, 1' in parallel, both of which have a protrusion 5, 5' forming a deviation in the wider part 3, 3'. The channels have different surface area ratios and the diameter of the throttling part 2' in one channel is shorter than the diameter of the throttling part 2 in the other channel.

Figure 6:
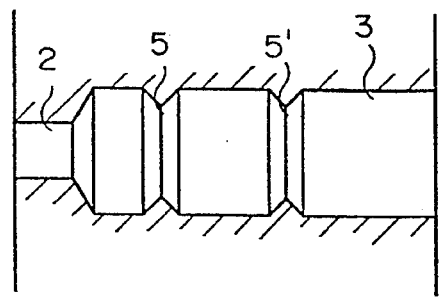
FIG. 6 is a lengthwise section of an application having two wall protrusions one after the other.

The application shown in FIG. 6 has two wall protrusions 5, 5' one after the other.

Figure 7:
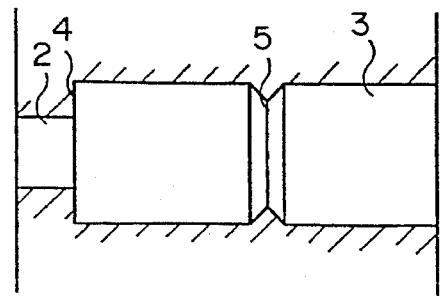
FIG. 7 shows still one application.

FIG. 7 shows an alternative design of the connection point 4, where the connection surface is perpendicular to the flow direction.

Figure 8A:
FIG. 8 is a graphic view of the reduction coefficient with the different hole geometries shown in FIGS. 8a–8c.
Figure 8B:
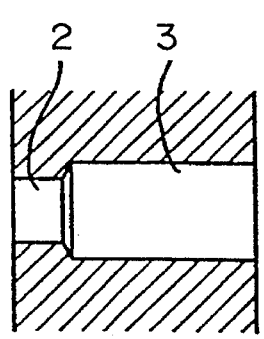
Figure 8C:
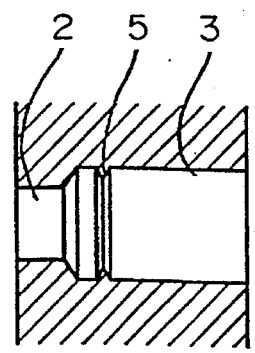
Figure 8:
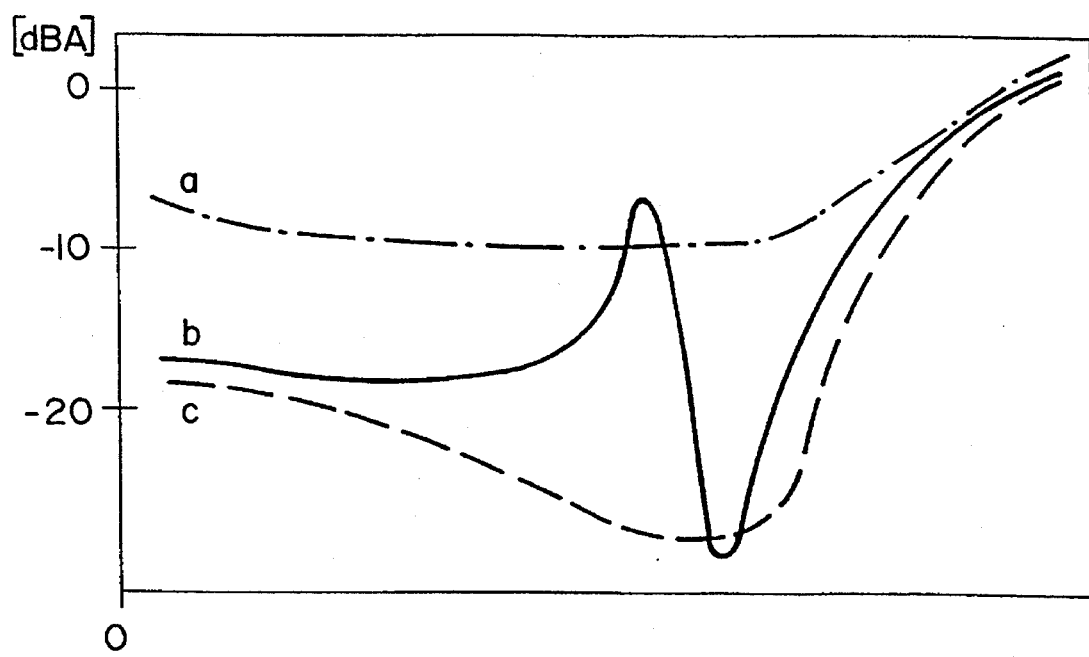

FIG. 8 is a graphic view of the relation of the reduction coefficient [dBA] to the pressure drop ratio dp/p1. Curve a shows a reduction obtained with the hole geometry or straight hole of FIG. 8a. The reduction is almost nonexistent. Curve b shows the reduction of the hole in FIG. 8b. An efficient reduction as such is obtained, but only within a very narrow pressure drop ratio range. Curve c shows the reduction obtained with the structure according to the invention which has a good reduction coefficient and the reduction of which also covers a wide pressure drop ratio range.

The invention is not restricted only to the applications presented above, but it may vary in different ways within the scope of the claims.

The most advantageous dimensional ratios for the flow channel in each case depend on very many factors, such as the pressure, the pressure drop ratio, the flow velocity and flow volume, the cross-sectional size and shape of the flow channel etc.

In the enclosed drawings the flow channel is shown as rotational-symmetrical, but the channel may also have some other cross-section than a circular one, for example, a rectangle or a flat slot.

The projections of the flow channel deviation and the expanding part perpendicularly to the flow direction may also have shapes different from one another. For example, the ridge of the deviation may be serrated or wavelike. A deviation having a square cross-section may be used together with a circular expanding part etc.

We claim:

1. A device for reducing the noise caused by throttling a gas flow in a flow channel, said device comprising a channel having an entrance and an exit, a cross-section and a throttling part located along the flow channel, a portion of wider cross-section than said throttling part located between said throttling part and said exit, said throttling part including at least one deviation of the cross-section formed by a protrusion, said flow channel having a central axis and said protrusion tapering toward said central axis to form an acute angle so that, in a trans-sonic or supersonic flow passing over said protrusion, said protrusion will form a straight shock wave in the flow which will remain within a wide pressure drop ratio range to effect noise reduction.

2. A device according to claim 1, characterized in that the projection of the protrusion (5) perpendicularly to the direction of flow has a shape different from the projection of the wider part (3) immediately adjacent to the deviation (5).

3. The device as claimed in claim 1 wherein the protrusion has a base and the cross-section of the protrusion has a ratio between said base lengthwise of the channel to the dimension radially of the channel of not more than 3:1.

4. The device as claimed in claim 3 wherein the ratio between the base lengthwise of the channel to the dimension radially of the channel is not more than 2:1.

5. The device as claimed in claim 1 wherein the flow channel has a first wider portion followed by at least one portion which is wider than each preceding portion and which also contains, at a point closer to the entrance than to the exit of said wider portion, said at least one deviation of the cross-section.

6. The device as claimed in claim 1 wherein said device has several parallel flow channels each having a throttling part followed by a part of wider cross-section than said throttling part and wherein the surface area ratios of said parallel flow channels are similar to one another.

7. The device as claimed in claim 1 wherein said device has several parallel flow channels each having a throttling part followed by a part of wider cross-section than said throttling part and wherein the surface area ratios of said parallel flow channels are different from one another.

8. The device as claimed in claim 1 wherein said deviation has a diameter which is 5 to 75% smaller than the diameter of said portion of wider cross-section.

9. The device as claimed in claim 1 wherein said deviation has a diameter that is 10 to 50% smaller than the diameter of said portion of wider cross-section.

10. The device as claimed in claim 1 wherein said throttling part has a diameter which is 15 to 80% of the diameter of said portion of wider cross-section.

11. The device as claimed in claim 1 wherein said deviation has a length which is 1 to 30% of the total length of said portion of wider cross-section and said deviation.

12. The device as claimed in claim 1 wherein said deviation has a length which is 5 to 20% of the total length of said portion of wider cross-section and said deviation.

13. The device as claimed in claim 1 wherein said protrusion includes two converging surfaces each extending in a direction different from the direction of the gas flow through said device.

* * * * *